United States Patent Office 3,294,678
Patented Dec. 27, 1966

3,294,678
PROCESS FOR DEASPHALTENING HEAVY
PETROLEUM CRUDE OIL
William K. T. Gleim, Island Lake, Ill., assignor to Universal Oil Products Company, Des Plaines, Ill., a corporation of Delaware
No Drawing. Filed Jan. 29, 1964, Ser. No. 341,099
10 Claims. (Cl. 208—309)

The invention described herein is adaptable to the treating of heavy hydrocarbon fractions, mixtures and/or distillates. More particularly, the present invention is directed toward a method for removing high-boiling asphaltenic material from petroleum crude oils and topped or reduced crude oils. Through the utilization of the present invention, a heavy hydrocarbon charge stock is made more suitable for use in a catalytic hydrorefining process for the purpose of effecting the substantially complete removal of various types of impurities including nitrogenous and sulfurous compounds, and organo-metallic contaminants.

Petroleum crude oils, and topped or reduced crude oils, as well as other heavy hydrocarbon fractions and/or distillates including vacuum tower bottoms, atmospheric tower bottoms, black oils, heavy cycle stocks, visbreaker product effluent, etc., are contaminated by the presence of excessive concentrations of various non-metallic and metallic impurities which detrimentally affect various processes to which such heavy hydrocarbon mixtures may be subjected. Among these non-metallic impurities are nitrogen, sulfur and oxygen which exists as heteroatomic compounds, and which effectively poison various catalytic composites employed in a process for the conversion of such petroleum fractions. Nitrogenous and sulfurous compounds are further objectionable because combustion of fuels containing these impurities results in the release of nitrogen and sulfur oxides which are noxious, corrosive and present, therefore, a serious problem with respect to pollution of the atmosphere. Of the metallic contaminants, those containing nickel and vanadium are most common, although other metals including iron, copper, lead, zinc, etc., are often present. These metallic contaminants are generally found to exist within the crude oil as organo-metallic compounds of relatively high molecular weight, such as metallic porphyrins and the various derivatives thereof. At least a portion of the organometallic complexes are linked with high molecular weight asphaltenic material and become concentrated in the residual fraction during initial distillation. A reduction in the concentration of the organo-metallic compounds is not as easily achieved as a reduction in the concentration of the non-metallic compounds and to the extent that the crude oil, reduced or topped crude oil becomes suitable for further processing.

In addition to the foregoing described contaminating influences, crude oil and other heavy hydrocarbonaceous material contain high molecular weight asphaltenic compounds. These are non-distillable, oil-insoluble coke precursors which may be complexed with sulfur, nitrogen, oxygen and various metals. Generally the asphaltenic material is colloidally dispersed within the crude oil and, when subjected to heat, as in a vacuum distillation or atmospheric distillation process, have the tendency to flocculate, polymerize and thermally crack, whereby the conversion thereof to more valuable oil-soluble products becomes extremely difficult. Thus, in the heavy bottoms from an atmospheric crude oil distillation column, the partially polymerized asphaltenes exist as a solid material even at ambient temperatures. With respect to a process for hydrorefining, or treating of hydrocarbon fractions and/or distillates, the presence of large quantities of organo-metallic compounds, and particularly high molecular weight asphaltenic material, interferes considerably with the activity of the catalyst in regard to the destructive removal of the non-metallic compounds, which function is normally the easiest for the catalyst to perform to an acceptable degree. Therefore, it is highly desirable to produce a hydrocarbon mixture substantially free from asphaltenic material and organo-metallic compounds, which mixture is substantially reduced with respect to nitrogen and sulfur concentration.

The necessity for effecting the removal of the foregoing contaminating influences is well known to those possessing skill within the art of the various petroleum refining processes. Heretofore in the field of catalytic hydrorefining, two principal approaches have been advanced; liquid-phase hydrogenation and vapor-phase hydrocracking; these processes are relatively ineffective with respect to oil-insoluble asphaltenes which are colloidally dispersed within the charge stock. Consequently, the probability of effecting simultaneous contact between catalyst particles and asphaltenic material is remote. Furthermore, since the hydrogenation and/or hydrocracking reaction zones are maintained at elevated temperature, the retention of unconverted asphaltenes, suspended in a free liquid phase oil for an extended period of time, will result in flocculation making conversion thereof substantially more difficult, and a fixed bed process has been thought to be virtually precluded. The asphaltenes, being neither volatile nor dissolved in the crude, are unable to move to the catalytically active sites, the latter being obviously immovable. On the other hand, vapor phase hydrocracking is carried out either with a fixed-bed or expanded-bed system at temperatures substantially above about 950° F.; this is not entirely well-suited to treating crude and heavy hydrocarbon fractions due to the high production of coke and carbonaceous material resulting from the presence of high molecular weight asphaltenic material, with the result that the catalytic composite succumbs to relatively rapid deactivation.

The object of the present invention is to provide a method for the economic removal of asphaltenic material from a variety of heavy hydrocarbonaceous charge stocks. The present invention makes possible the subsequent utilization of a fixed-bed hydrorefining process, which, as hereinbefore set forth, has not been considered feasible due to the excessive deposition of coke and other gummy carbonaceous material.

A wide variety of heavy hydrocarbon fractions and/or distillates may be treated, or made suitable for further processing, through the utilization of the method encompassed by the present invention. Such heavy hydrocarbon fractions include full boiling range crude oils, topped or reduced crude oils, atmospheric distillates, vacuum tower bottoms, visbreaker bottoms product, heavy cycle stocks from thermally or catalytically-cracked charge stocks, etc. The present method is particularly well adaptable to the treating of crude oils and topped or reduced crude oils containing large quantities of asphaltenic material, and is especially advantageous when applied to the treating of atmospheric or vacuum tower bottoms, since the asphaltenic material in such charge stocks has become agglomerated to a certain extent by reason of the reboil temperature of fractionation, and is, therefore, significantly more resistant to conversion. For example, a Wyoming sour crude oil, having a gravity of 23.2 °API at 60° F., is highly contaminated by the presence of 2.8% by weight of sulfur, 2,700 p.p.m. of total nitrogen, approximately 100 p.p.m. of metallic complexes, computed as elemental metals, and contains a high-boiling asphaltenic fraction in an amount of about 8.4% by weight. Similarly, and a much more difficult charge stock to convert into useful liquid hydrocarbons, is a crude tower bottoms product having a gravity, °API at 60° F., of 14.3, and contaminated by the presence of 3.0% by weight of sulfur, 3,830 p.p.m. of total nitrogen, 105 p.p.m. of total metals and about 11.0% by weight of asphaltenic compounds. Asphaltenic material is a high molecular weight hydrocarbon mixture having the tendency to become immediately deposited within the reaction zone and other process equipment, and onto the catalytic composite in the form of a gummy, high molecular weight residue, whereby the catalytically active centers and surfaces of the catalyst are effectively shielded from the material being processed. Furthermore, as hereinbefore stated, the presence of excessive quantities of asphaltenes appears to inhibit the activity of the catalyst with respect to the destructive removal of sulfurous and nitrogenous compounds. Thus, as hereinbefore set forth, the primary object of the present invention is to effect the removal of asphaltenic material from a hydrocarbon charge stock, and particularly from crude oil and/or topped or reduced crude oils which are intended to be used as charge stocks in hydrorefining and/or hydrocracking processes.

In a broad embodiment, the present invention relates to a method for removing asphaltenic material from a hydrocarbon charge stock, which method comprises treating said charge stock with a sulfurous compound selected from the group consisting of alkalinous bi-sulfides and bi-sulfites.

Another broad embodiment of the present invention encompasses a method for removing asphaltenic materials from a hydrocarbon charge stock, which method comprises treating said charge stock with an aqueous solution of a sulfurous compound selected from the group consisting of alkalinous bi-sulfides and bi-sulfides, and converting said asphaltenic material into a water-soluble sulfonic acid salt.

A specific embodiment of the present invention affords a method for removing asphaltenic material from a hydrocarbon charge stock, which method comprises treating said charge stock under a superatmospheric pressure of sulfur dioxide, with an aqueous solution of a sulfurous compound selected from the group consisting of alkalinous bi-sulfides and bi-sulfites, extracting the resulting water-soluble sulfonic acid salt with water and recovering said charge stock reduced in asphaltenic concentration.

From the foregoing embodiments, it will be noted that the present invention encompasses a method for decreasing the concentration of asphaltenic material in a petroleum crude oil. I have found that from about 10.0% to about 20.0% by weight of the total asphaltenic material present in a crude oil, and the heavier hydrocarbon fractions derived therefrom, is significantly more resistant to conversion, and causes an inordinately large proportion of the experienced difficulties, when the crude oil is subjected to hydrorefining and/or hydrocracking. This minor proportion of the asphaltenic material is that which possesses the tendency to become virtually immediately transformed into coke and gummy polymerization material, as a result of which the remaining portion of the asphaltenic material fails to come into contact with catalytically active sites, thereby also becoming increasingly more difficult to convert, and is more readily transformed into coke and carbonaceous material. It is, therefore, expedient and economical to remove from about 10.0% to about 20.0% by weight of the total asphaltenic material contained in the hydrocarbon charge stock. As hereinbefore set forth, as a result of the reboil temperature of fractionation, in a reduced or topped crude oil, or atmospheric or vacuum tower bottoms, the asphaltenic material has become agglomerated, thereby increasing the difficulty with which it is converted into more valuable liquid product. Therefore, in accordance with the method of the present invention, about 20.0% by weight of asphaltenic material is removed from atmospheric and vacuum tower bottoms, whereas about 10.0% by weight of asphaltenic material is removed from a full boiling range crude oil.

The method of the present invention, for the removal of asphaltenic material from a hydrocarbon charge stock, is conducted by converting the asphaltenic material into water-soluble sulfonic acid salts. The conversion of the asphaltenic material may be readily effected at a relatively low temperature within the range of from about 50° C., or room temperature, to about 300° C., through the use of an alkalinous bi-sulfide or bi-sulfite selected from the group consisting of ammonium, alkali and alkaline-earth metal bi-sulfides and bi-sulfites. The bi-sulfide and/or bi-sulfite is generally employed in an amount of from about 1.0% to about 20.0% by weight of the total hydrocarbon charge stock to be treated. The bi-sulfides and/or bi-sulfites of ammonium, lithium, sodium, potassium, cesium, beryllium, magnesium, calcium and strontium are preferred; the bi-sulfides and/or bi-sulfites of rubidium and barium appear to require greater concentrations in order to effect the conversion of asphaltenes into water-soluble sulfonic acid salts. The bi-sulfide and/or bi-sulfite, for example, magnesium bi-sulfiite is utilized in aqueous solution, being intimately admixed with the crude oil to be treated. The mixture is heated to a temperature within the range of about 100° C. to about 300° C., although the treating may be effected at room temperatures; temperatures above about 300° C. are avoided in order to insure against the premature cracking of the charge stock and flocculation or polymerization of the asphaltenic material, as well as the high-molecular weight olefinic hydrocarbons. The treating process is effected under an imposed pressure within the range of about 150 to about 2,000 p.s.i.g., and in the presence of sulfur dioxide in an amount such that the partial pressure thereof is within the range of about 150 to about 1,500 p.s.i.g.

The thus treated hydrocarbon charge stock is contacted with water in either upward flow or downward flow, for the purpose of extracting the water-soluble sulfonic acid salts derived from the asphaltenes. Through the utilization of this treatment, the concentration of asphaltenic material, for example in an atmospheric tower bottoms, will be decreased from about 11.0% to about 8.5% by weight, and, with respect to a full boiling range crude oil, from about 8.4% to about 7.0% by weight. The asphaltenic material which remains in the crude oil, or atmospheric tower bottoms, is more readily converted by subsequent hydrorefining and or hydrocracking processes into valuable pentane-soluble hydrocarbon product, without incurring the virtually immediate deposition of coke and carbonaceous material which otherwise leads to rapid catalyst deactivation. Thus, a subsequent hydrorefining process may be conducted for an extended period of time before the catalytic composite employed must necessarily be regenerated, or replaced as a result of the natural deterioration of the catalytically active metallic components.

Briefly, the method of conducting the present invention, as applied, for example to a crude tower bottoms product having a gravity, ° API at 60° F., of 14.3, and contaminated by the presence of 3.0% by weight of sulfur, about 3,830 p.p.m. of total nitrogen, 105 p.p.m. of total metals and about 11.0% by weight of asphaltenic material, is initiated, for example, by admixing the crude tower bottoms product with an aqueous solution of about 15.0% by weight of calcium bi-sulfite. The mixture is placed in a suitably manifolded enclosed vessel, and sufficient sulfur dioxide is added at 60 p.s.i.g. to insure a pressure of 1,200 p.s.i.g. at a temperature of 200° C. The contents of the vessel are heated to a level of about 200° C., and maintained under these conditions for a period of from about one hour to about four hours, being agitated throughout the period in order to provide intimate contact of the contents. The resulting hydrocarbon mixture, containing converted asphaltenic material in the form of water-soluble sulfonic acid salts, are passed into a suitable extraction column countercurrently to a stream of water. Upon analysis, the resulting hydrocarbon mixture is found to have an asphaltenic concentration of about 8.5% by weight.

The resulting hydrocarbon charge stock, reduced in asphaltenic concentration, is more readily subjected to a subsequent hydrorefining and/or hydrocracking process for the purpose of eliminating the sulfurous and nitrogenous compounds and the organo-metallic complexes, and to convert the charge stock into lower-boiling hydrocarbon products. Thus, the method of the present invention lends itself to a combination process wherein the crude oil, topped or reduced crude oil, or atmospheric or vacuum tower bottoms, is initially treated for the purpose of removing the asphaltenic material exhibiting the greatest resistance to conversion into pentane-soluble hydrocarbons. The subsequent hydro-refining and/or hydrocracking process is conducted at a temperature of from about 680° F. to about 850° F., under an imposed hydrogen pressure of from about 100 to about 3,000 p.s.i.g. Hydrogen is employed in admixture with the charge stock in an amount of from about 5,000 to about 100,000 s.c.f./bbl. The liquid hourly space velocity, defined as volumes of hydrocarbon charge per hour per volume of catalyst disposed within the reaction zone is at least partially dependent upon the physical and chemical characteristics of the charge stock, and will be within the range of from about 0.5 to about 10.0. The catalytic composite, utilized in the hydrorefining and/or hydrocracking process, is a composite of a refractory inorganic oxide carrier material and catalytically active metallic component selected from the group consisting of Groups V–B, VI–B and VIII–B of the Periodic Table. Thus, the catalytic composite may comprise one or more metallic components from the group of vanadium, niobium, tantalum, molybdenum, tungsten, chromium, iron, cobalt, nickel, platinum, palladium, iridium, osmium, rhodium, ruthenium, and mixtures thereof. The refractory inorganic oxide carrier material may comprise alumina, silica, zirconia, magnesia, titania, boria, strontia, hafnia, and mixtures of two or more, including silica-alumina, silica-zirconia, silica-alumina-magnesia, alumina-zirconia-silica, etc. It is understood that the composition and physical characteristics of the catalytic composite employed in the subsequent hydrorefining and/or hydrocracking processes is not limiting upon the treating method of the present invention.

The following example is given for the purpose of illustrating the means by which the method, encompassed by the present invention, is effected. The charge stock, temperatures, pressures, reagents and concentrations are herein presented as being exemplary only, and are not intended to limit the present invention to an extent greater than that defined by the scope and spirit of the appended claims.

*Example*

The hydrocarbon charge stock employed in the example is the crude tower bottoms product previously described. An initial analysis indicates that this hydrocarbon charge stock, in addition to excessive concentrations of other contaminants, consists of a high-boiling asphaltenic fraction in an amount of about 10.93% by weight. The charge stock is intimately commingled with an aqueous solution of 15.0% by weight of equimolar mixture of sodium bi-sulfide and sodium bi-sulfite, and placed in a rotating autoclave having a capacity of about 1,800 cc. The contents of the autoclave are pressured to a level of about 60 p.s.i.g. With sufficient sulfur dioxide to insure saturation pressure of sulfur dioxide at a temperature of 150° C. The temperature is increased to a level of 150° C., the resulting final total pressure being about 1,100 p.s.i.g. After a period of about three hours at a temperature of 150° C. and a pressure of 1,100 p.s.i.g., the rotating autoclave is allowed to cool to about room temperature while being de-pressured.

The effluent from the autoclave is contacted countercurrently with water for the purpose of extracting the sulfonic acid salts derived from the asphaltenes. The resulting normally liquid hydrocarbon mixture, upon analysis, indicates an asphaltenic fraction in an amount of about 8.3% by weight, or removal of about 15.5% of the asphaltenic material originally present in the crude tower bottoms product.

The hydrocarbon charge stock, now devoid of the more conversion-resistant asphaltenic material, is more readily susceptible to conversion by way of hydrorefining and/or hydrocracking reactions without incurring the virtually immediate deposition of coke and gummy hydrocarbonaceous material onto the catalytic composites employed in such processes. The economic advantages afforded as a result of the extended acceptable life of the catalytic composite will be readily recognized by those possessing skill within the art of petroleum refining processes. An additional advantage lies in the fact that the hydrocarbon charge stock may be processed at significantly less severe conditions of temperature and pressure with the inherent result that a greater yield of valuable liquid hydrocarbon product is obtained, lesser quantities of the charge stock being converted into normally gaseous light paraffinic hydrocarbons, carbon dioxide, carbon monoxide, hydrogen, etc.

The foregoing example and specification illustrates the method by which the present invention is effected, and indicates the advantages afforded a process for hydrorefining petroleum crude oils and the heavier hydrocarbon fractions derived therefrom.

I claim as my invention:

1. A method for removing asphaltenic material from a heavy hydrocarbon charge stock containing said asphaltenic material which comprises treating said charge stock, at a temperature of from about 50° C. to about 300° C. and under a pressure of sulfur dioxide of from about 150 to about 1500 p.s.i.g., with an aqueous solution of a sulfurous compound consisting of a bi-sulfide or bi-sulfite of an alkali metal, alkaline earth metal or ammonium, thereby converting at least a portion of said asphaltenic material to a water-soluble sulfonic acid salt, extracting said sulfonic acid salt with an aqueous medium, and recovering said charge stock reduced in asphaltenic concentration.

2. The method of claim 1 further characterized in that said charge stock is a crude oil.

3. The method of claim 1 further characterized in that said charge stock is a reduced crude oil.

4. The method of claim 1 further characterized in that said charge stock is a vacuum tower bottoms.

5. A method of claim 1 further characterized in that said charge stock is a heavy cycle stock.

6. The method of claim 1 further characterized in that said sulfurous compound is sodium bi-sulfide.

7. The method of claim 1 further characterized in that said sulfurous compound is calcium bi-sulfite.

8. The method of claim 1 further characterized in that said sulfurous compound is ammonium bi-sulfide.

9. The method of claim 1 further characterized in that said sulfurous compound is magnesium bi-sulfite.

10. A method for removing asphaltenic material from a crude oil which comprises treating said crude oil at a temperature of from about 100° C. to about 300° C. and under a pressure of sulfur dioxide within the range of from about 150 to about 1,500 p.s.i.g., with an aqueous solution of a sulfurous compound consisting of a bi-sulfide or bi-sulfite of an alkali metal, alkaline earth metal or ammonium, thereby converting at least a portion of said asphaltenic material to a water-soluble sulfonic acid salt, extracting said water-soluble sulfonic acid salt with water and recovering said crude oil reduced in asphaltenic concentration.

References Cited by the Examiner

UNITED STATES PATENTS

| | | | |
|---|---|---|---|
| 1,980,555 | 11/1934 | Schulze et al. | 208—283 |
| 2,306,484 | 12/1942 | McClintock | 208—253 |
| 2,540,129 | 2/1951 | Lauer et al. | 208—253 |

DELBERT E. GANTZ, *Primary Examiner.*

HERBERT LEVINE, *Examiner.*